(12) United States Patent
Nasca et al.

(10) Patent No.: US 10,427,610 B2
(45) Date of Patent: Oct. 1, 2019

(54) ACCESSORY TRAY FOR A VEHICLE

(71) Applicant: GM GLOBAL TECHNOLOGY OPERATIONS LLC, Detroit, MI (US)

(72) Inventors: Jeff E. Nasca, Bloomfield Township, MI (US); Ross A. Pitcole, Fenton, MI (US)

(73) Assignee: GM GLOBAL TECHNOLOGY OPERATIONS LLC, Detroit, MI (US)

(\*) Notice: Subject to any disclaimer, the term of this patent is extended or adjusted under 35 U.S.C. 154(b) by 116 days.

(21) Appl. No.: 15/712,186

(22) Filed: Sep. 22, 2017

(65) Prior Publication Data

US 2019/0092244 A1    Mar. 28, 2019

(51) Int. Cl.
*B60R 7/04*    (2006.01)
*B60R 11/00*    (2006.01)

(52) U.S. Cl.
CPC ....... *B60R 7/043* (2013.01); *B60R 2011/0012* (2013.01); *B60R 2011/0071* (2013.01)

(58) Field of Classification Search
CPC .................................................... B60R 7/043
USPC ...................................................... 296/37.15
See application file for complete search history.

(56) References Cited

U.S. PATENT DOCUMENTS

| | | | | |
|---|---|---|---|---|
| 5,096,249 | A * | 3/1992 | Hines ...................... | B60R 7/043 224/275 |
| 6,074,000 | A * | 6/2000 | Wagner .................... | A47C 7/62 297/188.08 |
| 7,530,631 | B2 * | 5/2009 | Skelly ...................... | B60N 2/62 297/188.08 |
| 7,780,229 | B2 * | 8/2010 | Verhee .................... | B60R 7/043 297/188.08 |
| 9,950,674 | B1 * | 4/2018 | Kalergis ............... | B60N 2/3009 |
| 2008/0231063 | A1 | 9/2008 | Bowers | |
| 2008/0265634 | A1 * | 10/2008 | Verhee .................... | B60N 2/58 297/188.11 |

FOREIGN PATENT DOCUMENTS

FR        2710297 A1 *  3/1995  ............. B60R 7/043

OTHER PUBLICATIONS

Machine Translation of FR-2710297-A1, printed from the EPO website, Apr. 14, 2019.*

\* cited by examiner

*Primary Examiner* — Jason S Morrow
(74) *Attorney, Agent, or Firm* — Lorenz & Kopf, LLP

(57) ABSTRACT

An accessory tray for a vehicle may include a console adjacent to a front passenger seat, the front passenger seat having a seat pan and/or structure and a seat cushion. An accessory tray is positioned under a front portion of the seat cushion when the accessory tray is in a closed position. The accessory tray has a first end coupled to the seat pan adjacent to the console via a pivot mechanism, and a second free end. In operation, the accessory tray pivots via the pivot mechanism, causing the second free end of the accessory tray to move toward the console or perpendicular to the seat in open position where the accessory tray is adjacent to the console to receive an accessory item.

17 Claims, 23 Drawing Sheets

ACCESSORY TRAY FOR A VEHICLE

INTRODUCTION

The present disclosure generally relates to vehicles, and more particularly relates to a storable accessory tray for receiving accessories of a vehicle operator or passenger.

Contemporary vehicles provide a number of areas to store or hold items for the vehicle operator or passengers. For example, most vehicles include a glove compartment and various cup holders positioned throughout the vehicle. Some vehicles include storage drawers or compartments positioned beneath one or more of the vehicle seats. However, under-seat storage compartments are not readily assessable while the vehicle is in operation.

Accordingly, it is desirable to provide an accessory tray for a vehicle that keeps the accessory in easy access of the vehicle operator. In addition, it is desirable to have the accessory tray be storable at times it is not in use. Furthermore, other desirable features and characteristics of the present disclosure will become apparent from the subsequent detailed description of the disclosure and the appended claims, taken in conjunction with the accompanying drawings and the background of the disclosure.

SUMMARY

A vehicle having an accessory storage tray is provided. The vehicle includes a front passenger seat, the front passenger seat having a seat pan or structure and a seat cushion. An accessory tray is positioned under a front portion of the seat cushion when the accessory tray is in a closed position. The accessory tray has a first end coupled to the seat pan or other structure via a pivot mechanism and a second end. In operation, the accessory tray pivots via the pivot mechanism, causing the second end of the accessory tray to move toward a front driver seat (or adjacent to a console if provided), considered as an open position to receive and/or support an accessory item.

In another aspect of the disclosure, the pivot mechanism includes a spring mechanism for moving the accessory tray from the closed position to the open position.

In another aspect of the disclosure, the second end of the accessory tray is held in the closed position by a latch.

In another aspect of the disclosure, the pivot mechanism includes a release mechanism that when operated, releases the latch and allows the spring mechanism to move the accessory tray from the closed position to the open position.

In another aspect of the disclosure, the accessory tray has expandable netting to support the accessory item.

In another aspect of the disclosure, the vehicle includes a console adjacent to the front passenger seat and the free end of the accessory tray includes a magnet. The console includes a metal plate or magnet at a mating location when the accessory tray is in the open position whereby magnetic forces between the magnet and the metal place support the free end of the accessory tray in the open position.

In another aspect of the disclosure, the vehicle includes a console adjacent to the front passenger seat and the console includes a support surface extending from the console positioned to support the free end of the accessory tray in the open position.

A vehicle having an accessory storage tray is provided. The vehicle includes a console adjacent to a front passenger seat, the front passenger seat having a seat pan or other structure and a seat cushion. The accessory tray is positioned under a front portion of the seat cushion when the accessory tray is in a closed position. The accessory tray has a first end slidably coupled to a guide coupled to the seat pan or other structure and a second end adjacent to the console. In operation, as accessory tray moves to an open position, the first end moves along the guide toward the console and the second end moves forward along the console to an open position where the accessory tray is adjacent to the console to receive an accessory item.

In another aspect of the disclosure, the second end of the accessory tray is held in the closed position by a latch.

In another aspect of the disclosure, the accessory tray has expandable netting to support the accessory item.

In another aspect of the disclosure, the second end of the accessory tray includes a magnet or metal plate and the console includes a metal plate at a mating location when the accessory tray is the open position whereby magnetic forces between the magnet and the metal place support the free end of the accessory tray in the open position.

In another aspect of the disclosure, the console includes a support surface extending from the console positioned to support the free end of the accessory tray in the open position.

In another aspect of the disclosure, a spring assist mechanism is provided for moving the accessory storage tray toward the open position.

In another aspect of the disclosure, a motor open/close mechanism for moving the accessory storage tray between the open position and the closed position.

In another aspect of the disclosure, the accessory storage tray moves between the open position and the closed position while a passenger is seated in the front passenger seat.

A vehicle having an accessory storage tray is provided. The vehicle includes a console adjacent to a front passenger seat, the front passenger seat having a seat pan or other structure and a seat cushion. An accessory tray is positioned between the console and the front passenger seat in a closed position. One end of the accessory tray is coupled to a guide coupled to the seat structure allowing the accessory tray to slide forward along the guide toward an open position where a portion of the accessory tray pivots away from the console to receive the accessory item.

In another aspect of the disclosure, the accessory tray is held in the closed position by a latch.

In another aspect of the disclosure, the accessory tray has the portion pivoting away from the console including expandable netting to support the accessory item.

In another aspect of the disclosure, a free end of the accessory tray includes a magnet and the console includes a metal plate at a mating location when the accessory tray is in the open position whereby magnetic forces between the magnet and the metal place support the free end of the accessory tray in the open position.

In another aspect of the disclosure, the console includes a support surface extending from the console positioned to support the free end of the accessory tray in the open position.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
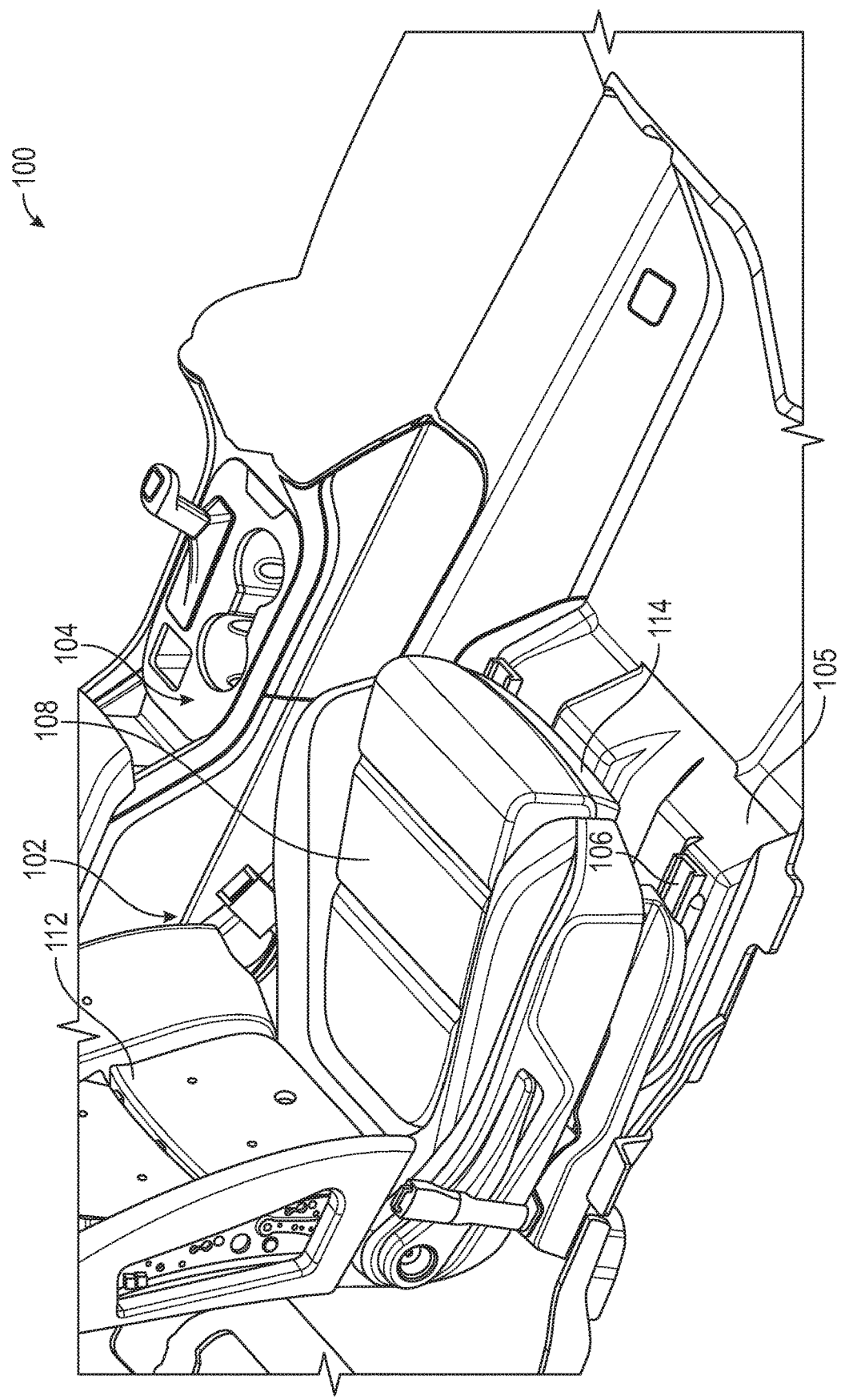
FIGS. 1-14 illustrate an exemplary embodiment of an accessory tray in accordance with the present disclosure.

The following detailed description is merely exemplary in nature and is not intended to limit the disclosure or the application and uses of the disclosure. Furthermore, there is no intention to be bound by any theory presented in the preceding background or the following detailed description. In particular, while the present disclosure is explained in the context of an automotive vehicle, it will be appreciated that the vehicle may be any one of a number of different types of vehicles, such as, aircraft, watercraft, rail vehicles, space vehicles or other land vehicles, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD) and may employ an electric, hybrid or internal combustion powertrain.

FIGS. 1-14 illustrate an accessory tray for a vehicle in accordance with exemplary embodiments. The vehicle 100 includes a passenger seat 102 and a console 104 adjacent to the passenger seat 102. The passenger seat 102 includes a frame 105 that is secured to a chassis (not shown) of the vehicle and rides along guide rails 106 so that the seat 102 may translate along the guide rails into a position comfortable for the passenger. The seat 102 also includes a seat cushion 108 that is positioned over a seat pan 110 (best seen in FIGS. 2-4) and a seat back 112. According to the exemplary embodiments illustrated in FIGS. 1-5, the vehicle 100 includes an accessory tray 114 that is positioned underneath a front or leading edge of the seat cushion 108 in a closed (or stowed) position, and pivots on a single axis to move toward the driver seat or console (if provided) to an open (or deployed) position. The accessory tray 114 may be pivoted via an assist (e.g., spring) device (FIGS. 5-6) or manually (FIGS. 10-15) as will be discussed below.

Figure 3:
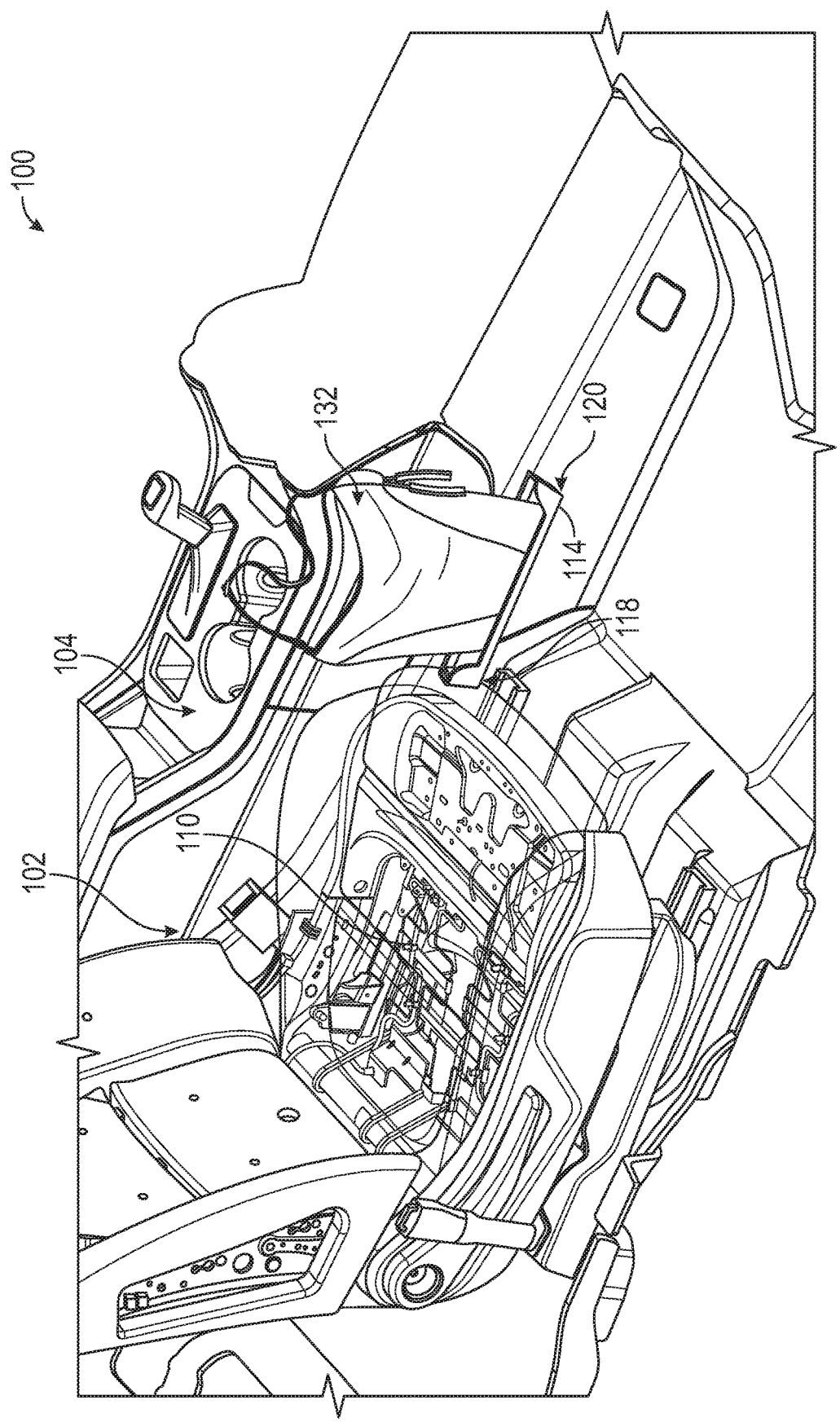

The accessory tray 114 includes a first end 118 that is pivotally connected to the seat pan or other structure 110 (best seen in FIG. 5) and a second free end 120. In operation, the accessory tray 14 has the first end pivot about the pivotal connection 122 causing the free end 120 of the accessory tray 114 to move in the direction indicated by arrow 116 towards the console 104 (or driver seat). In one embodiment, the deployed accessory tray 114 (without netting, other embodiments discussed below) is illustrated in FIG. 3 in the open position and has received an accessory item 132 (in this example a purse). As can be seen in FIG. 3, the accessory (purse) is positioned away from the vehicle operator but is readily accessible by the vehicle operator. Additionally, the present disclosure contemplates that for smaller accessories 132' that are occasionally needed (e.g., an umbrella), that the accessory 132' may reside in the storage tray 114 in the stowed position to be readily accessed when needed.

Figure 2:
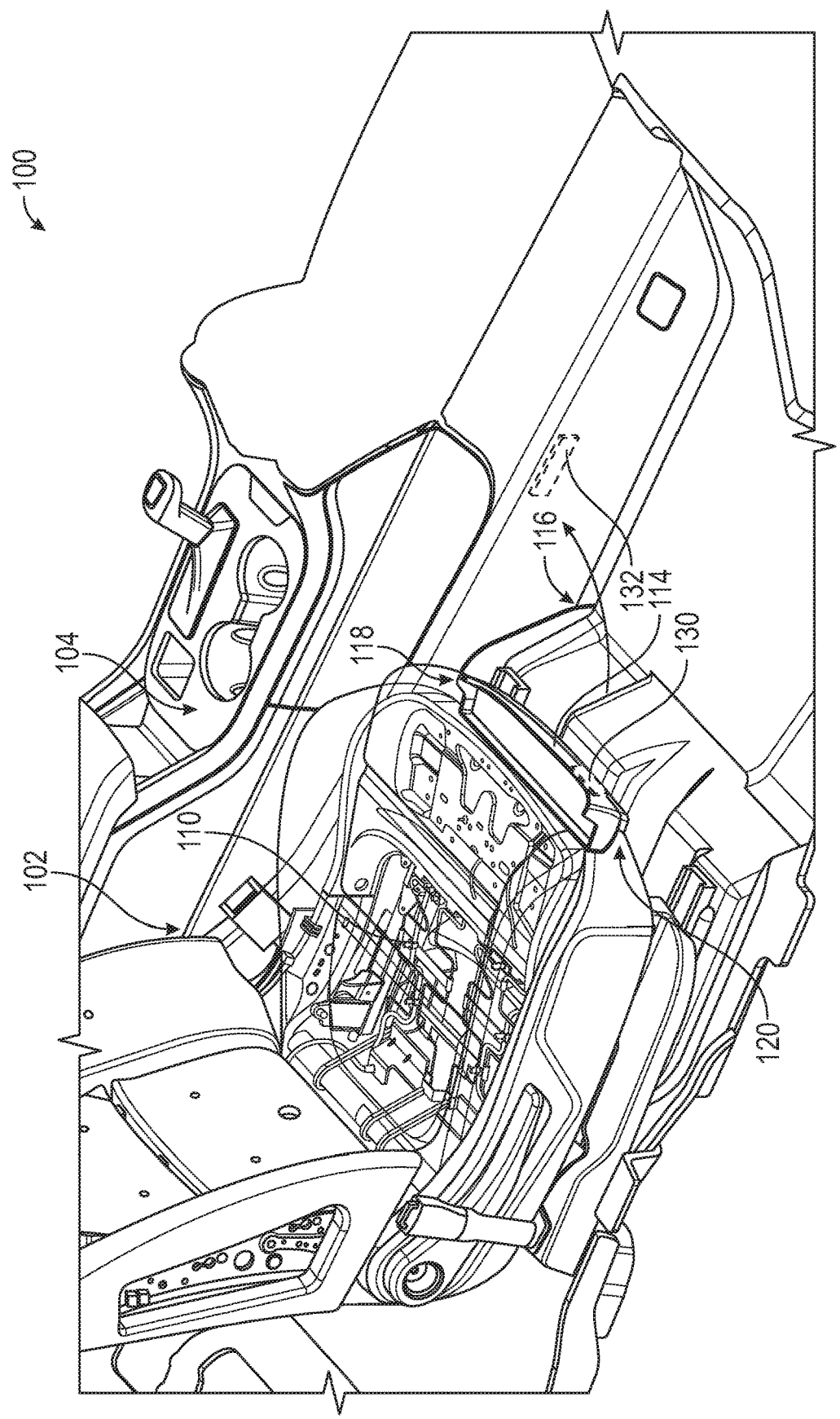
Figure 4:
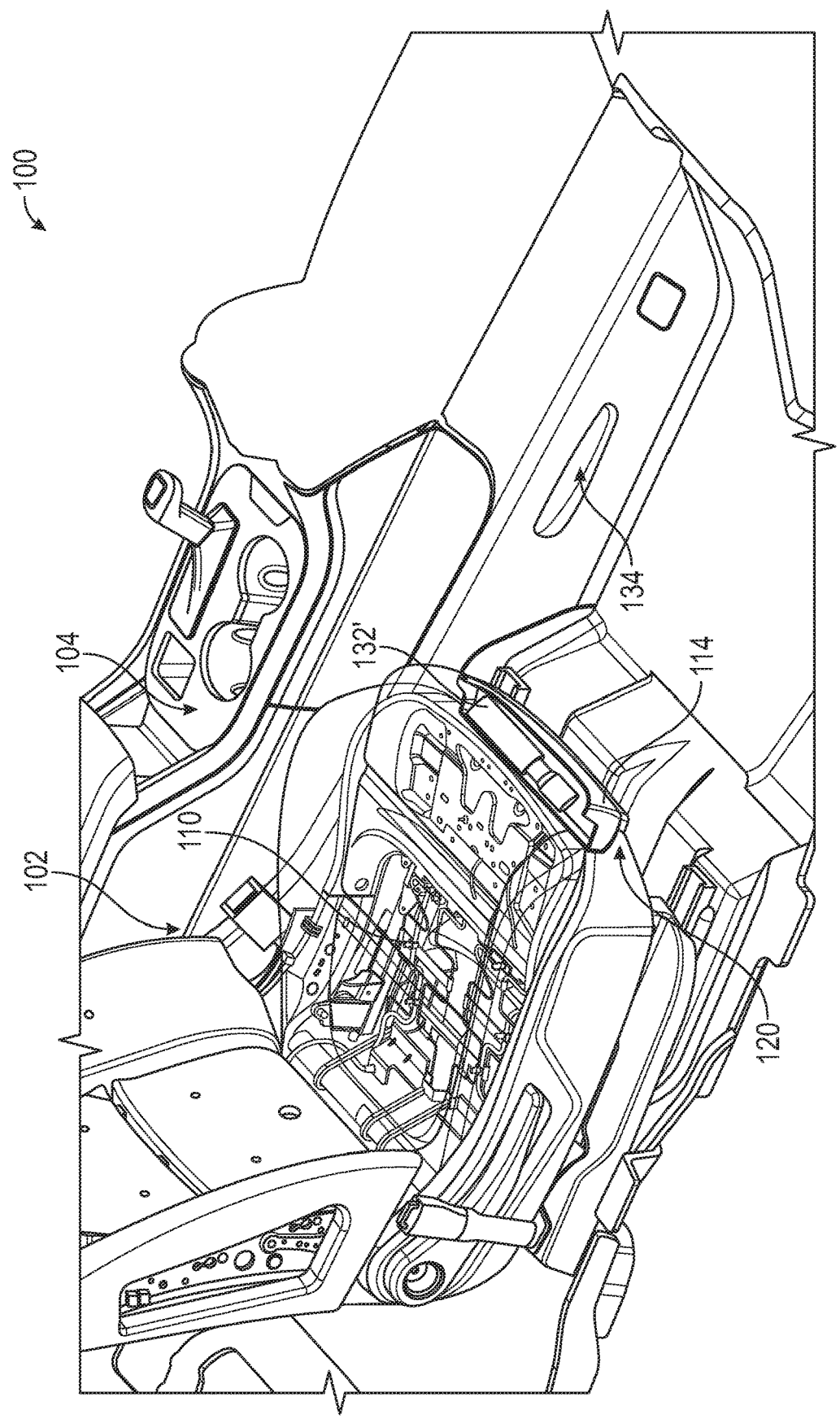

To assist in supporting heavier accessories, the present disclosure contemplates that a magnet 130 may be positioned in the free end 120 the accessory tray 114 (FIG. 2). In the open position, the magnet would interact with a metal plate (or magnet of opposite polarity) 132 embedded in the console 104 so that the magnetic attraction between the magnet 130 in the metal plate/strip/magnet 132 would help support the weight of accessory item 132. In some embodiments, the metal plate/strip/magnet 132 would be of any length that would approximately cover the full and/or partial seat travel as deemed necessary in any particular implementation. In other embodiments, the present disclosure contemplates the addition of a support shelf or ledge 134 that would support the free end 120 of the accessory tray 114 when in the open position (FIG. 4).

Figure 5:
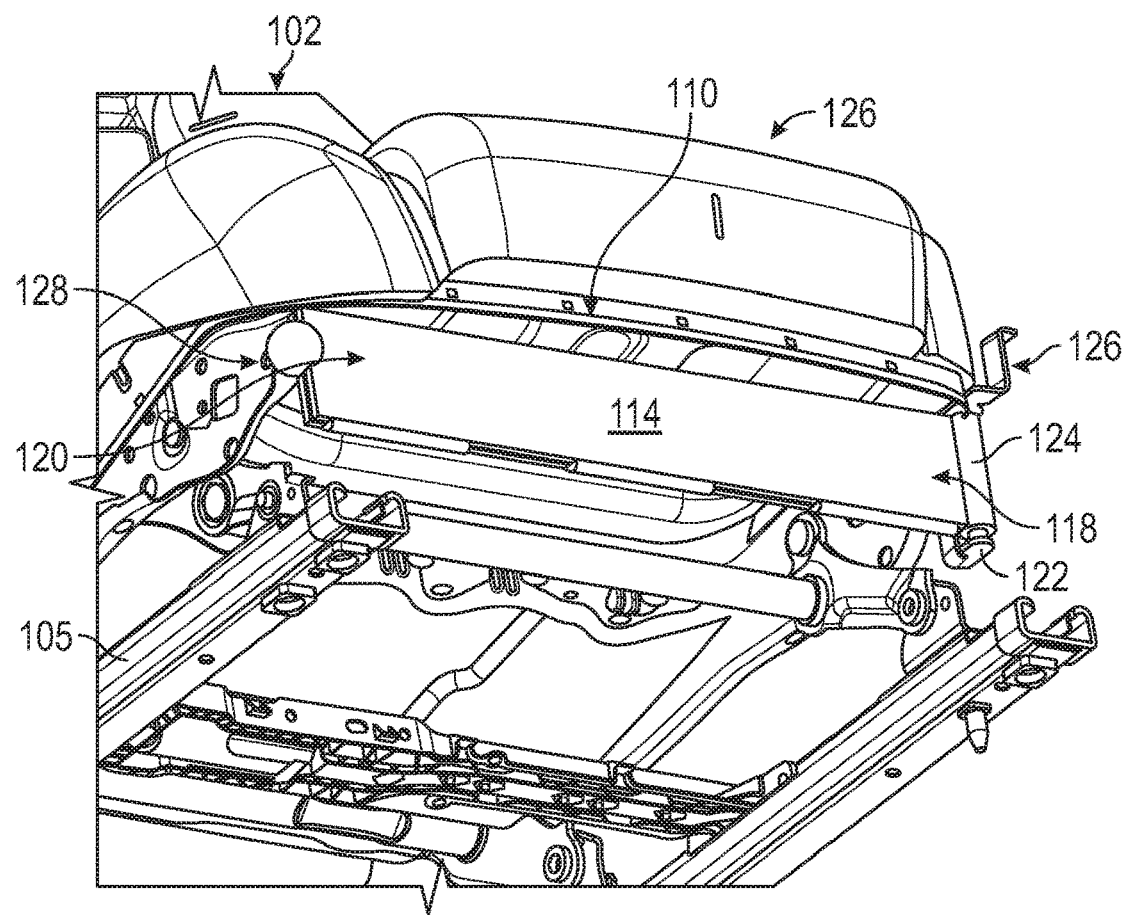
Figure 6:
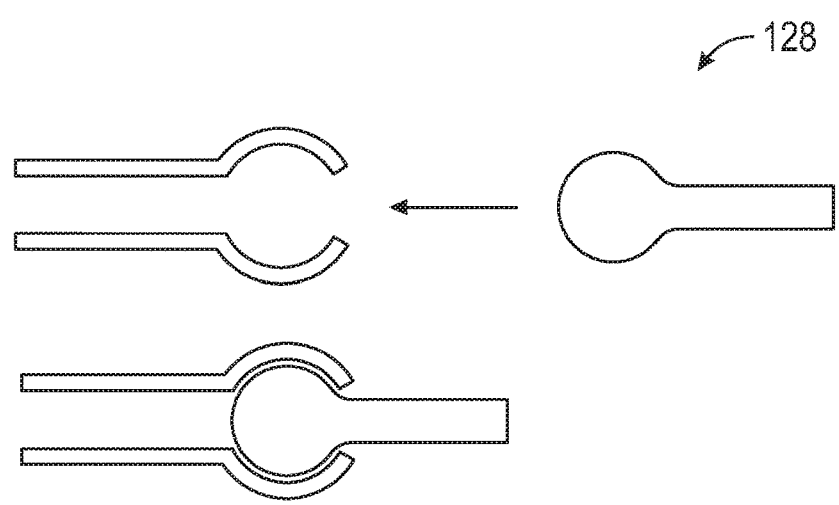

FIG. 5 is a perspective front view of the accessory tray 114 in the closed position. In accordance with some embodiments, the accessory tray 114 is coupled at the pivotal end 116 by a pivot mechanism 122. In some embodiments, the pivot mechanism 122 includes a spring assist device 124 that will automatically move (via spring energy) the accessory tray 114 to the open position. The free end 120 of the assessment tray 114 is held in the closed position by a latch 128, which in non-limiting embodiments may be a ball-and-socket latch as shown in FIG. 6. When a release lever 126 is operated, the spring force of the spring assist device 124 overcomes the retraining ability of the latch 128 causing the accessory tray 114 to be released and the spring-loaded assist mechanism 124 moves the accessory tray from the closed position toward the open position. As noted above, the free end 120 of the accessory tray can be supported mechanically by a support shelf or magnetically by a magnet/plate combination.

Figure 7:
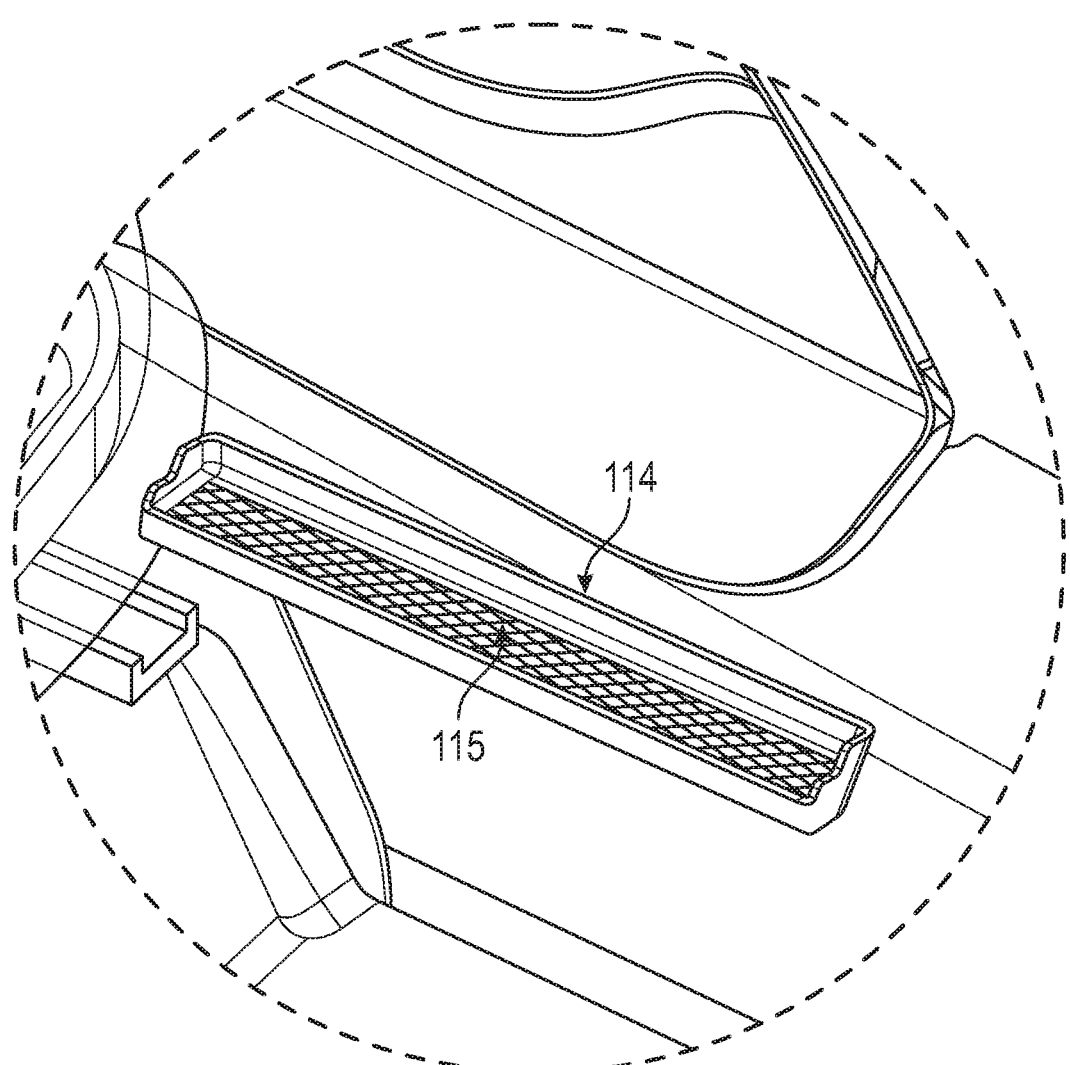
Figure 8:
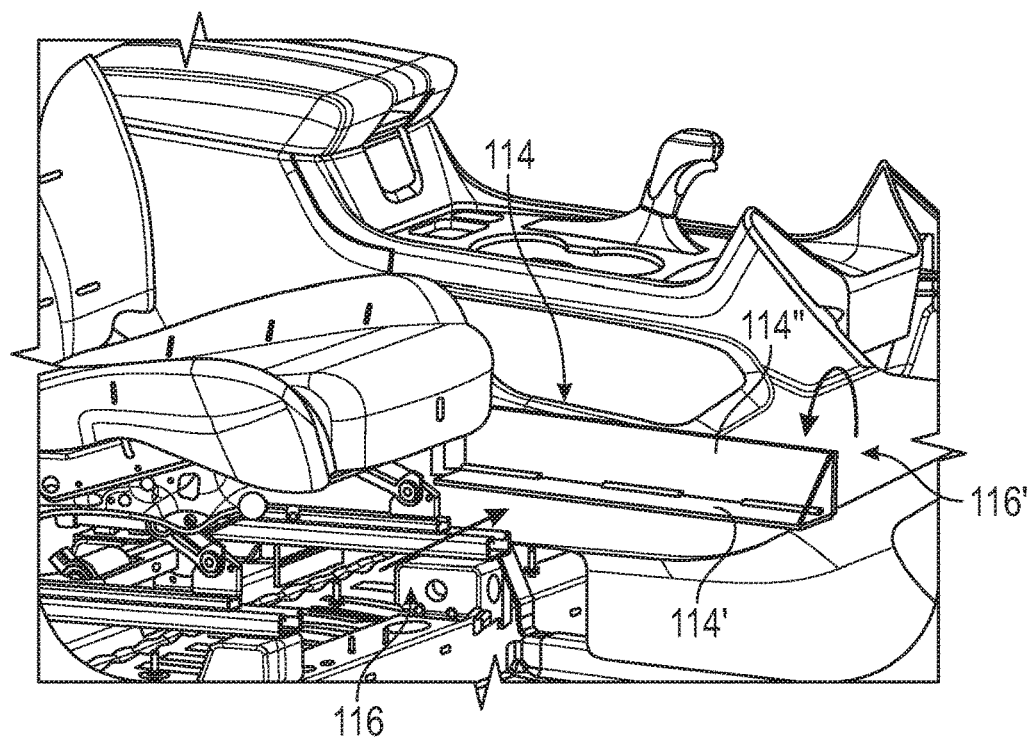
Figure 9:
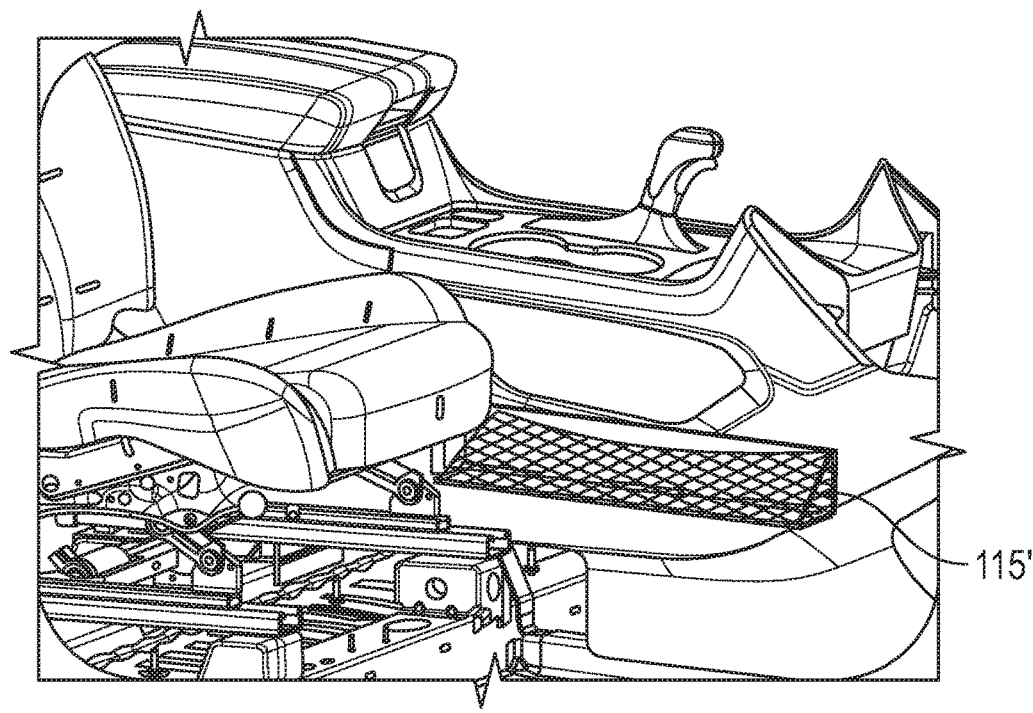
Figure 10:
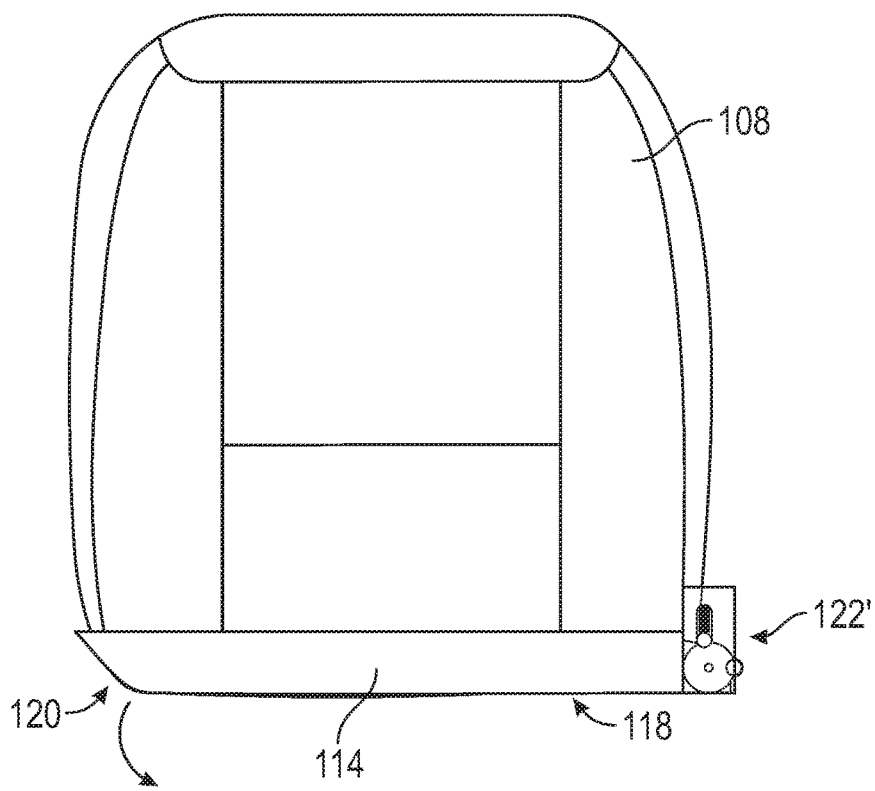
Figure 11:
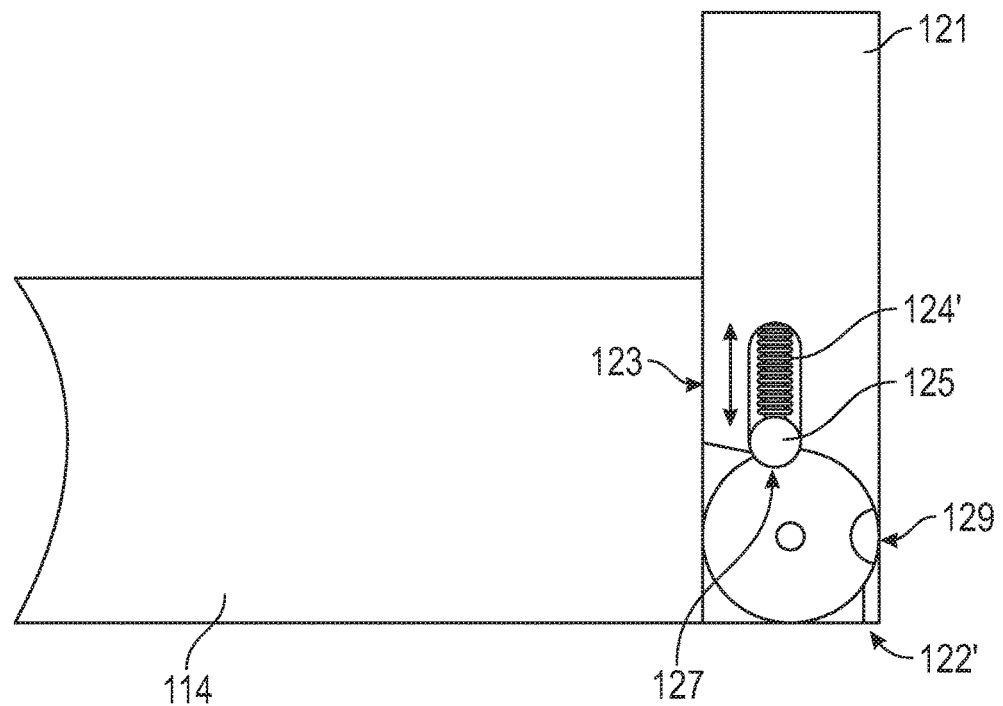

FIGS. 7-9 illustrate non-limiting alternate configurations of the accessory tray 114. In FIG. 7, a bottom portion of the accessory tray 114 includes a netting 115 to receive the accessory item. In some embodiments, the netting 115 may be an expandable or elastic netting. In FIGS. 8-9, the accessory tray 114 is illustrated as utilizing a foldout shelf configuration. After the accessory tray has been deployed along arrow 116 (manually or via assist device), a panel 114' is folded away (e.g., via piano-type hinges) from a panel 114" along arrow 116' to form the accessory tray 144. In some embodiments, netting 115' may be used with the embodiment of FIGS. 8-9 which offer and advantage when there is limited space since the accessory tray 114 remains in a folded configuration in the stored position.

Figure 12:
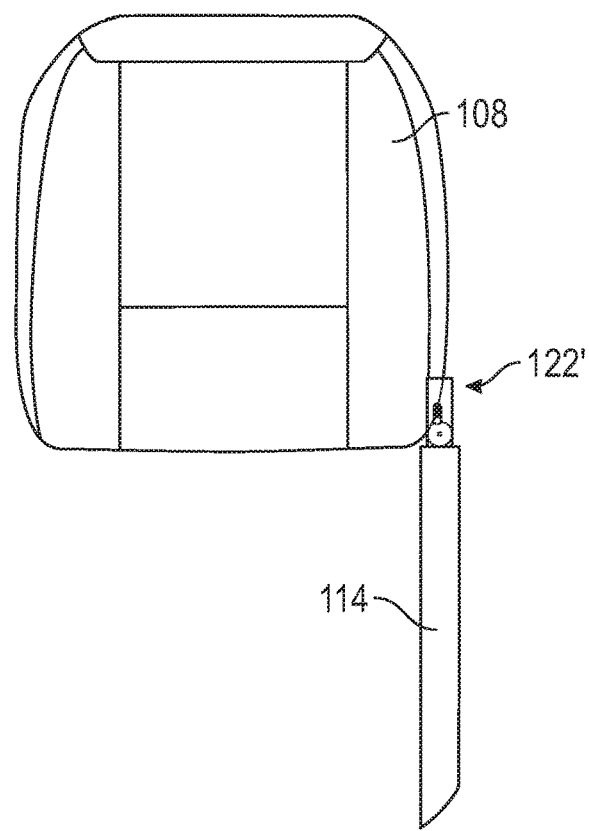
Figure 13:
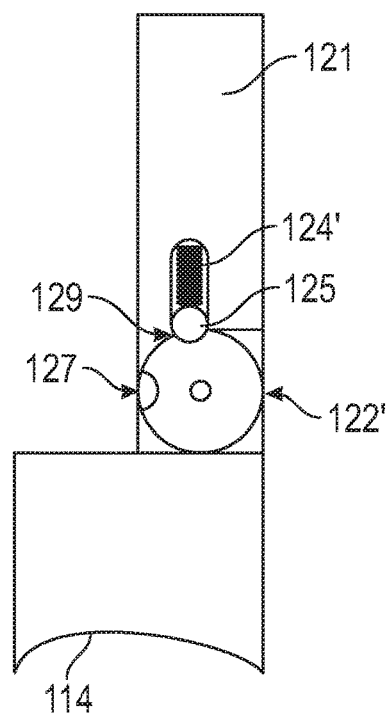
Figure 14:
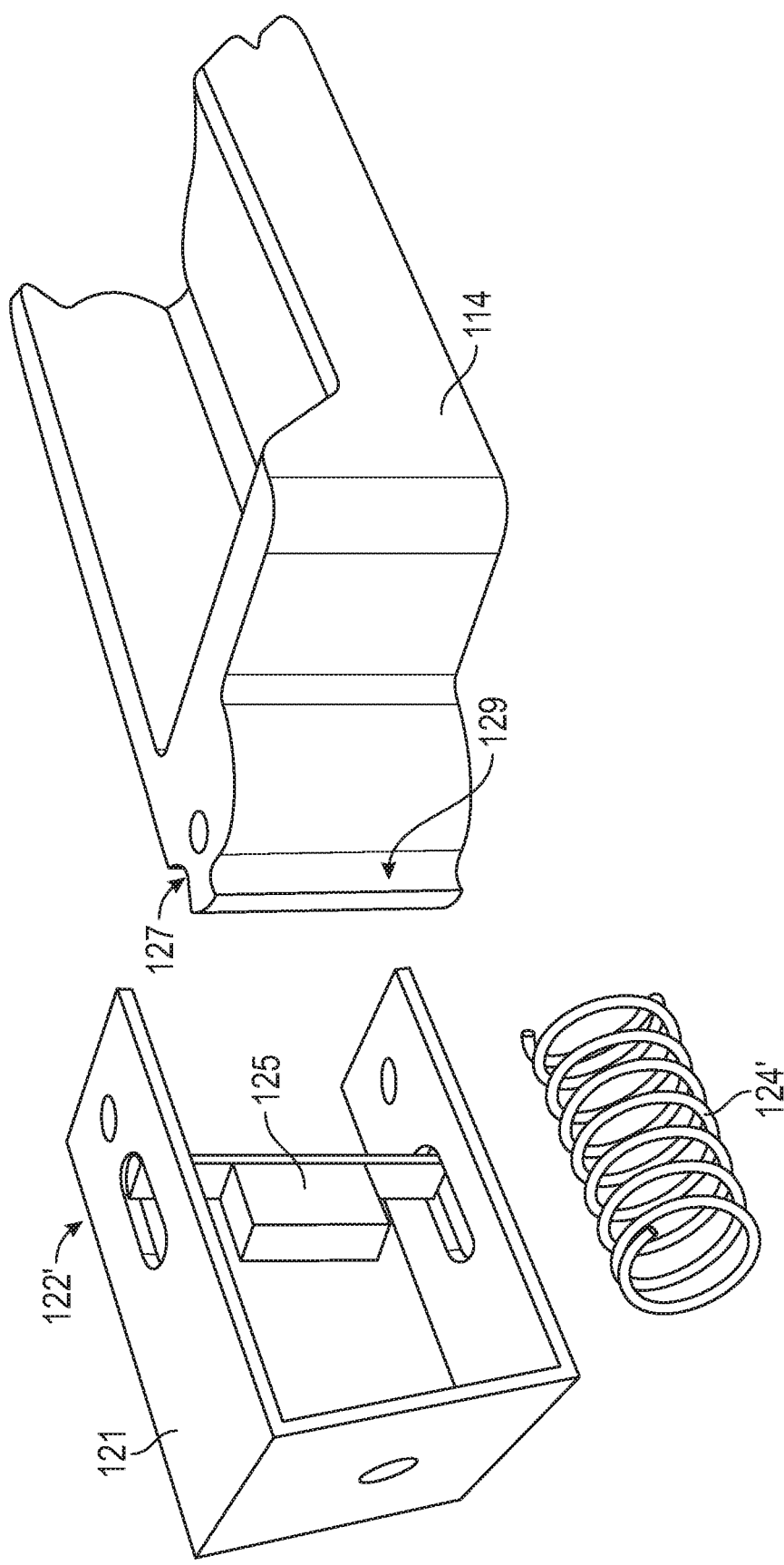

FIGS. 10-14 illustrate a non-limiting configuration for manual accessory tray operation. The accessory tray 114 includes a first end 118 that is connected the pivotal connection 122' allowing the free end 120 of the accessory tray 114 to move from a stored (closed) position (FIGS. 10-11) toward the console 104 or driver seat to an open (deployed) position (FIGS. 12-13). The pivotal connection 122' includes a mounting bracket 121 (to be mounted to the seat pan or other structure) housing a spring 124' allowing a bar or pin 125 to move in the direction indicated by arrow 123. The spring loaded bar or pin 125 mates with detents 127 (closed position) and 129 (open position) to hold the accessory tray 114 in the open or closed position as desired. FIG. 14 provides an exploded view of the pivotal connection 122' to aid in the understanding of the operation of this embodiment.

FIGS. 15-24 illustrate another exemplary embodiment of an accessory tray for a vehicle provided by the present disclosure in which an accessory tray 136 operates using a dual-action deployment arrangement. As will be apparent, this embodiment offers an advantage in that the accessory tray 136 may be opened with a passenger is seated in the passenger seat as the accessory tray opens below and around the passenger's legs.

Figure 15:
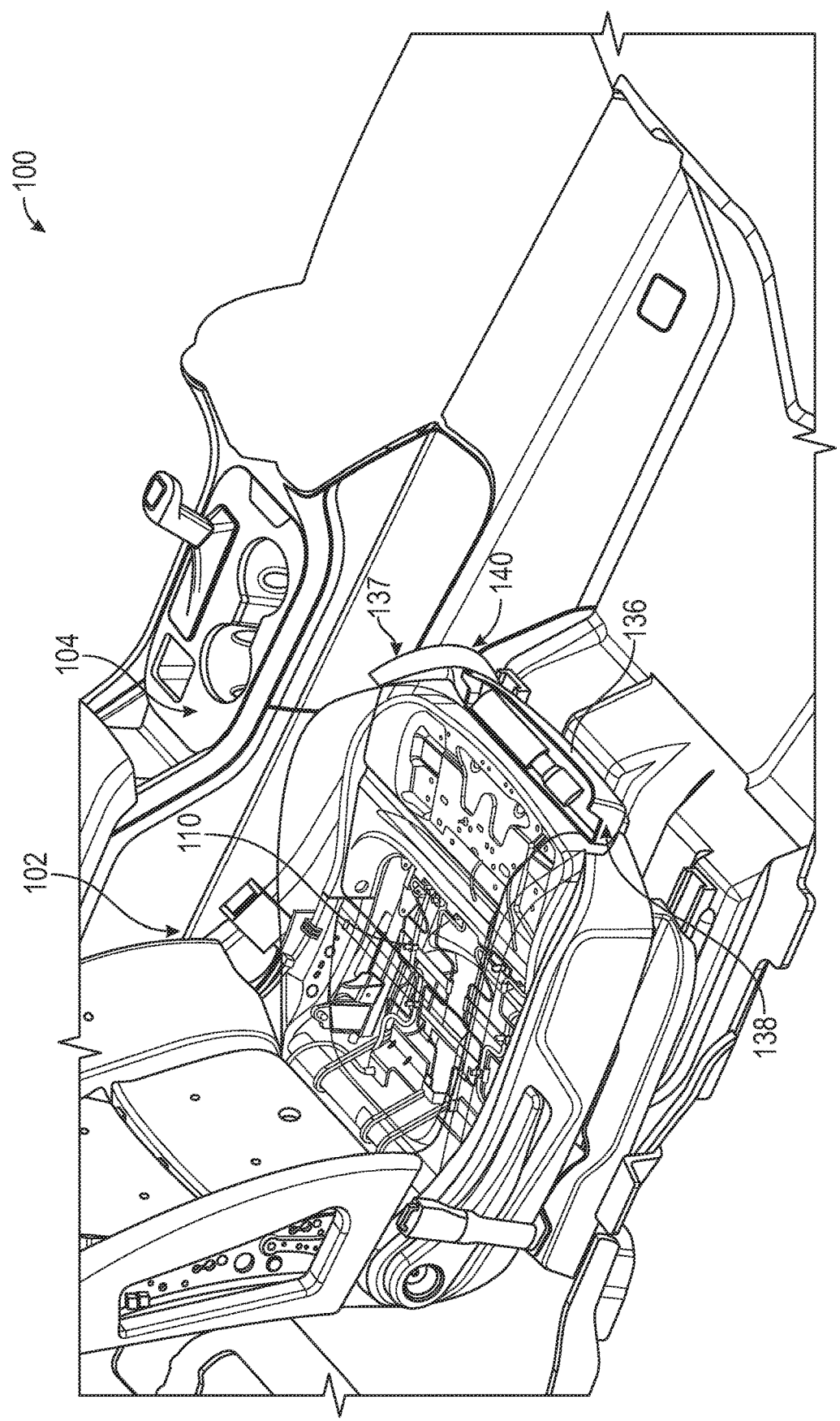
FIGS. 15-24 illustrate another exemplary embodiment of an accessory tray in accordance with the present disclosure.
Figure 16:
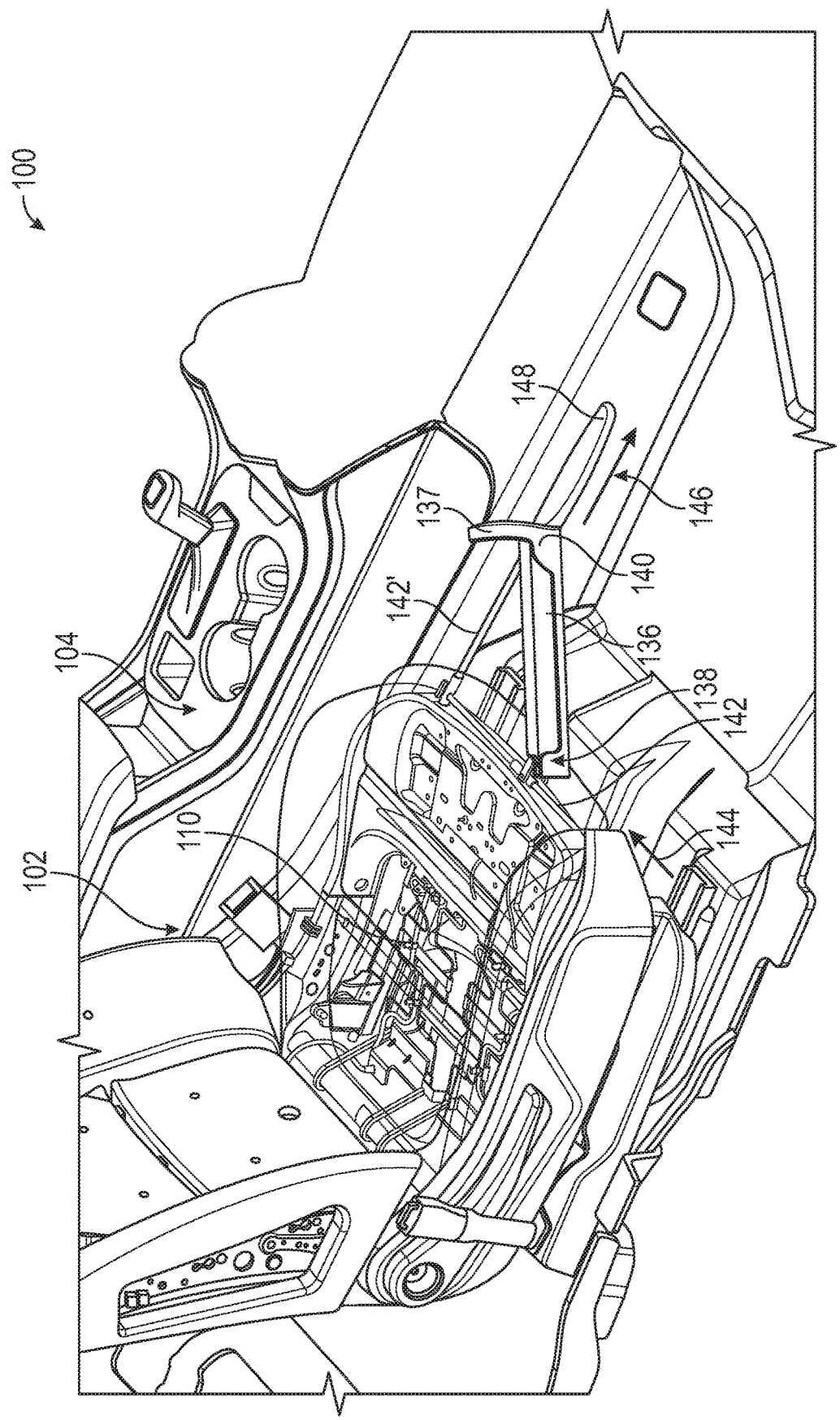
Figure 17:
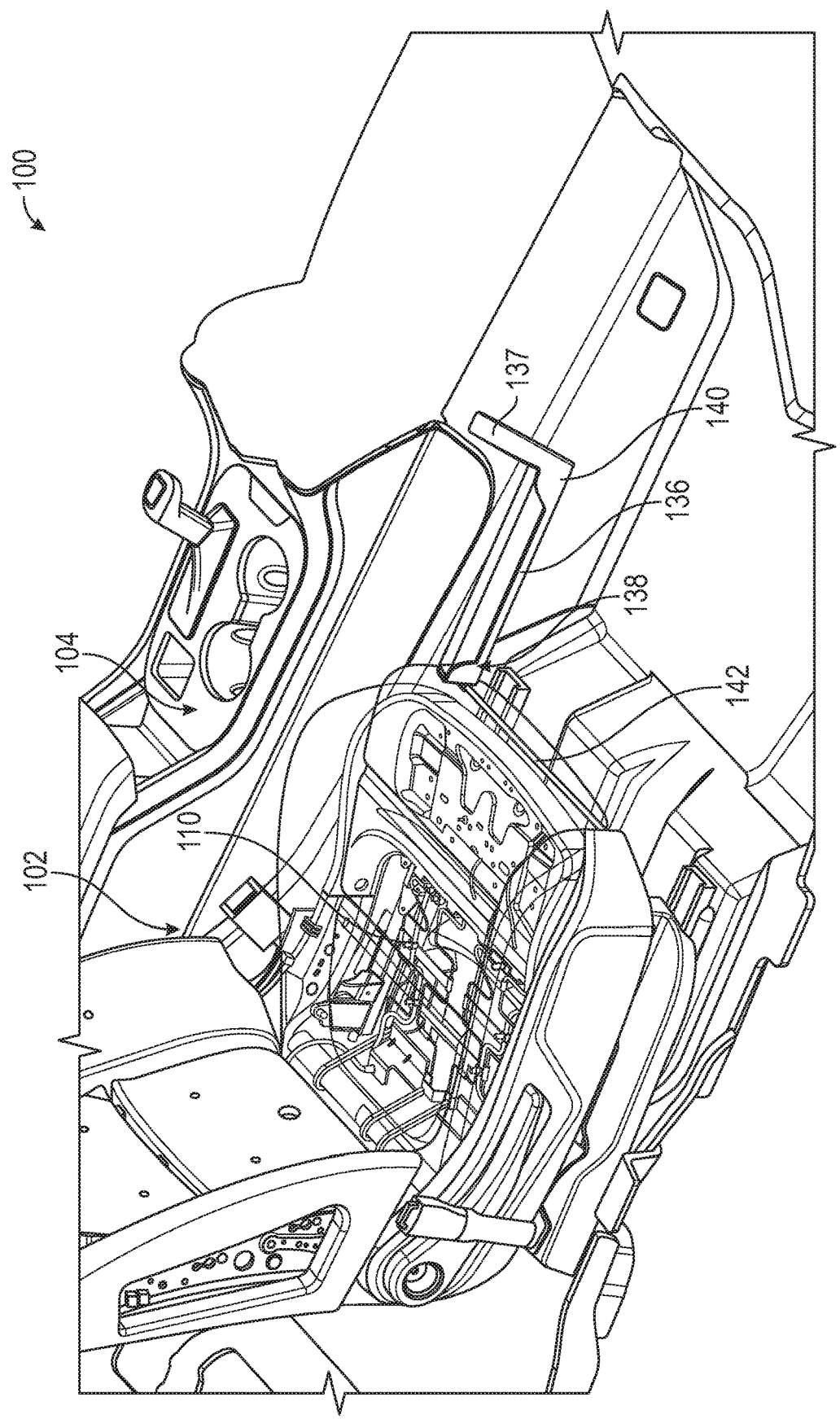

Considering first a manual embodiment, FIGS. 15-17 illustrate the accessory tray moving from a stowed position (FIG. 15), through a mid-position (FIG. 16) to an open position (FIG. 17). Moving from the closed (stowed) position, the accessory tray 136 has a first end 138 slidably coupled to a guide 142, and a second end 140 that may be held in place by a latch such as a push-push latch (not shown) that may be released by operating a handle 137.

Figure 18:
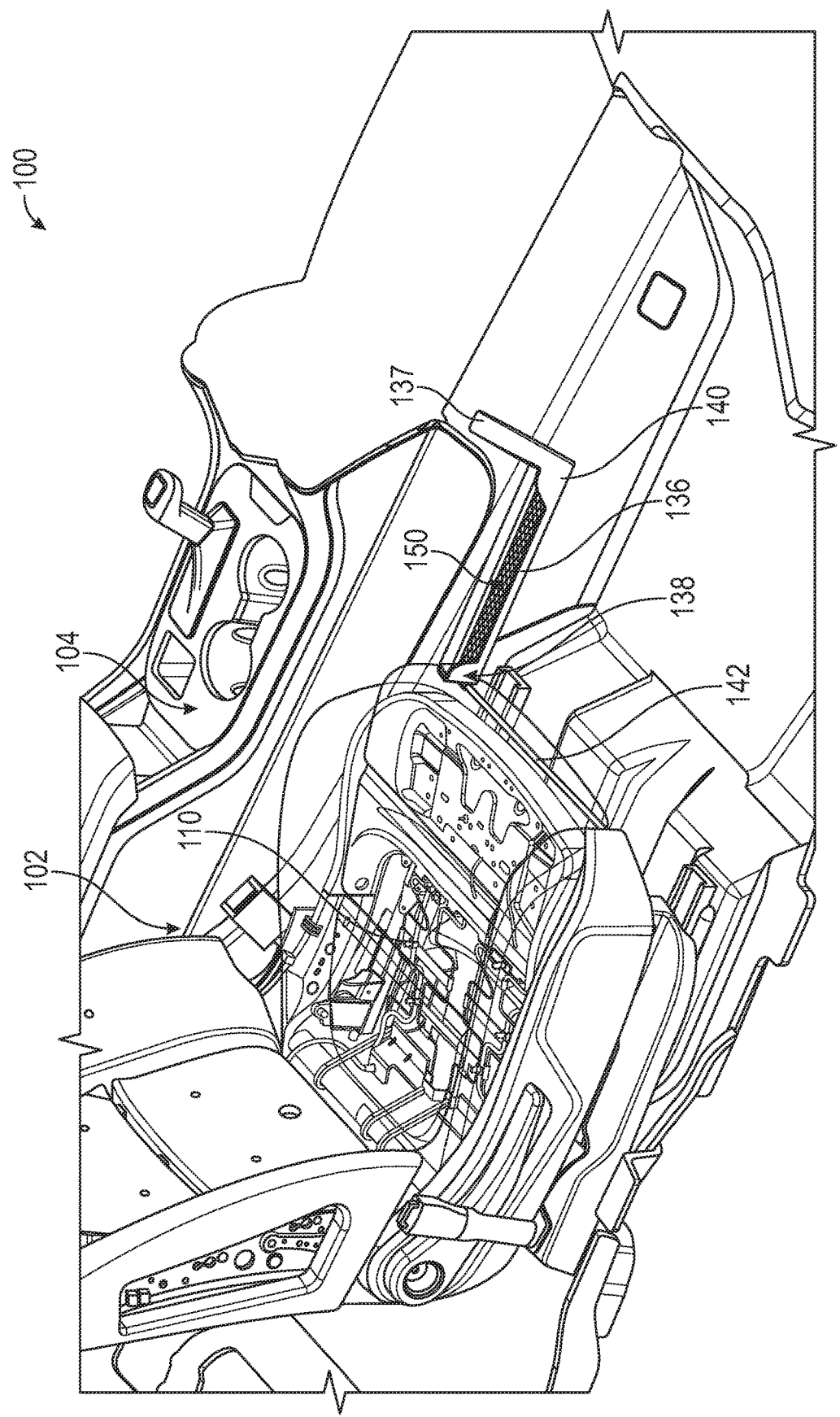

Once released, the vehicle operator may manually move the handle 137 causing the first end 138 to slide towards the console along the guide 142 (as indicated by arrow 144), while the second end 140 is moved forward (as indicated by arrow 146) along a guide 142' by the operator towards an open position as seen in FIG. 17. As discussed above, the second end 140 of the accessory tray 136 may be received and supported by a support shelf 148 (FIG. 11) that in some embodiments may include a magnet or plate embedded therein to magnetically hold the second end 140 so that the accessory tray 136 doesn't inadvertently move toward the closed position. Also, as shown in FIG. 18, the accessory tray 136 may include netting 150 along a bottom portion thereof to receive the accessory item.

Figure 20:
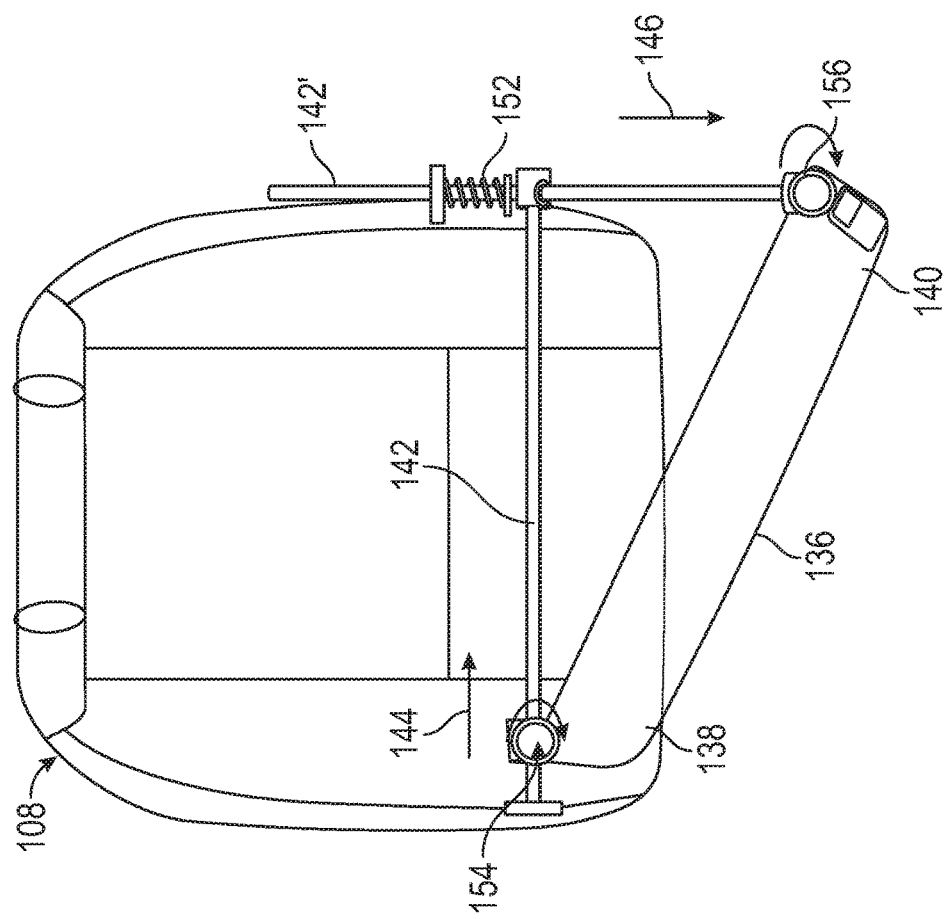
Figure 19:
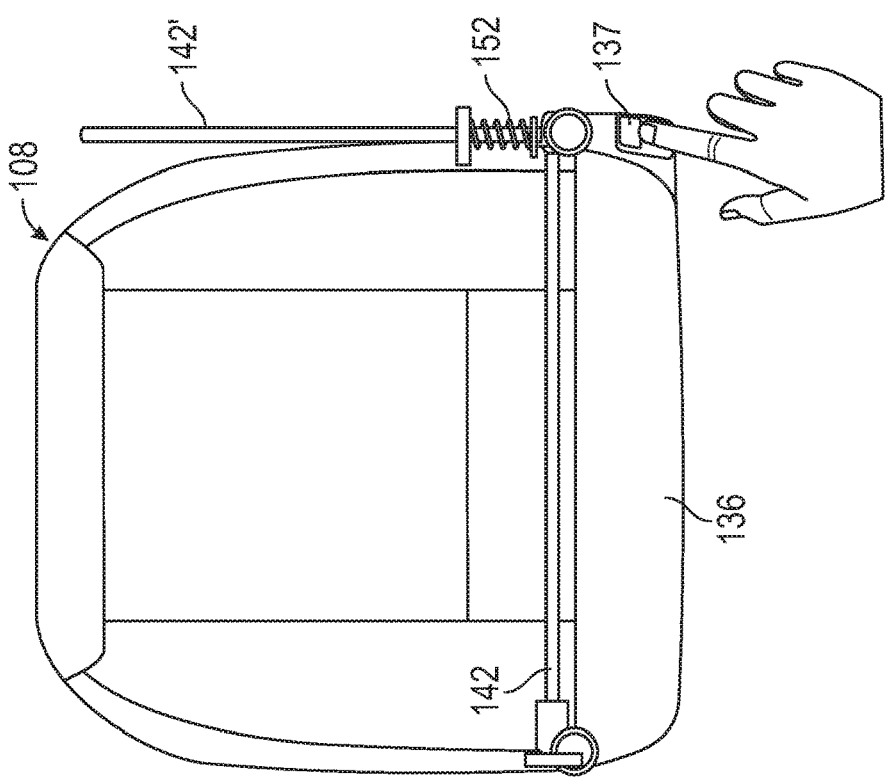
Figure 21:
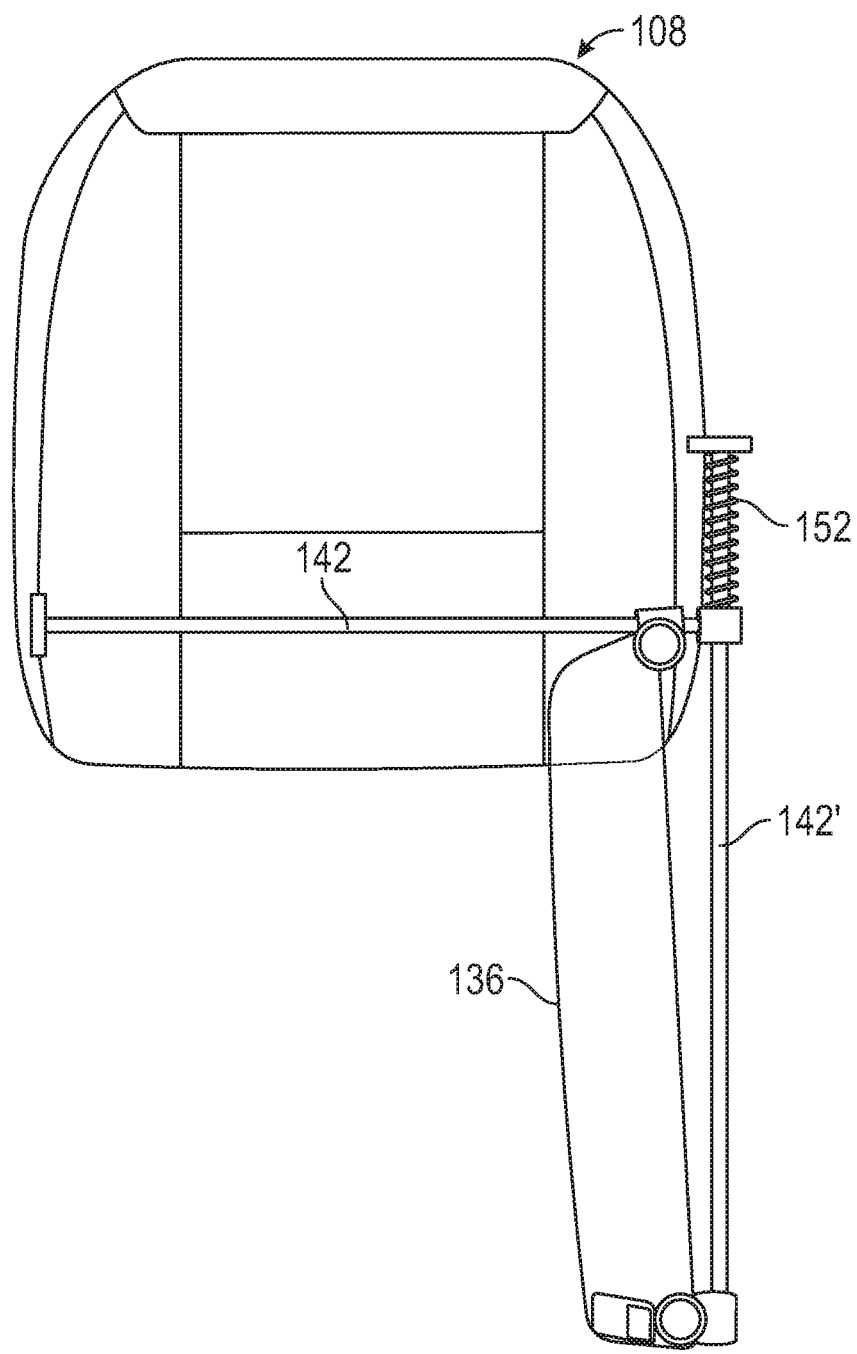
Figure 22:
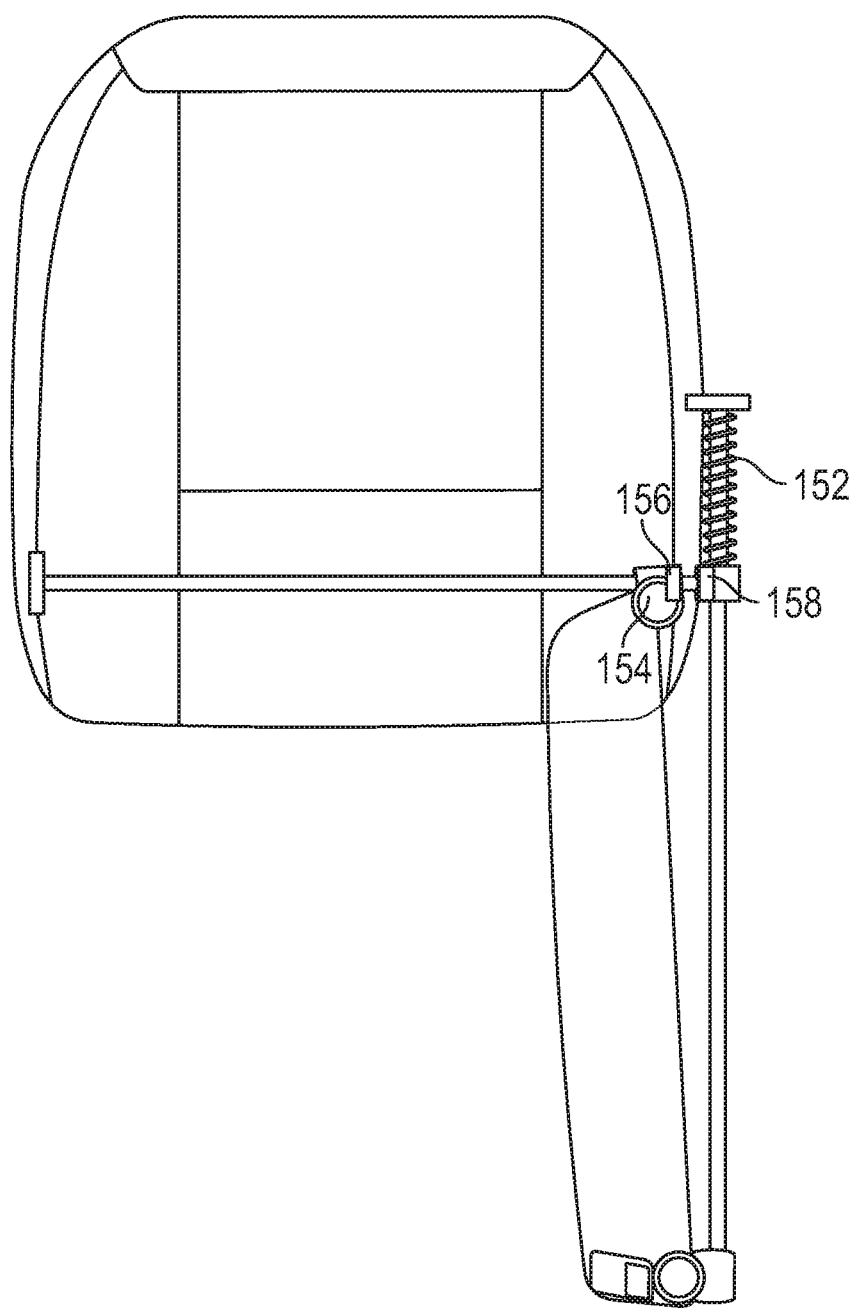

FIGS. 19-24 offer non-limiting power assist options for the accessory tray 136. In FIGS. 19-22, the accessory tray 136 includes a spring assist mechanism 152 that will expand from a compressed state in the closed position (FIG. 19) upon release by a use operating the release lever 137. In some embodiments, this may be realized using a push-push latch. As shown in FIG. 20, as the spring assist mechanism 152 expands, the second end 140 of the accessory tray moves outward as indicated by arrow 146 while pivoting about a hinge 156. The first end 138 slides along guide 142 as indicated by arrow 144 while pivoting about a hinge 154 until deployed in the open position as shown in FIG. 21. To retract the accessory tray 136 to the closed position, the user presses back against the spring assist mechanism 152 spring force until the accessory tray 136 is latched in the closed position (FIG. 19). In some embodiments, additional accessory tray hold-open force may be provided by including magnetic attraction between the hinge 154 and spring assist mechanism 152 by employing magnets 156 and 158 as shown in FIG. 22.

Figure 23:
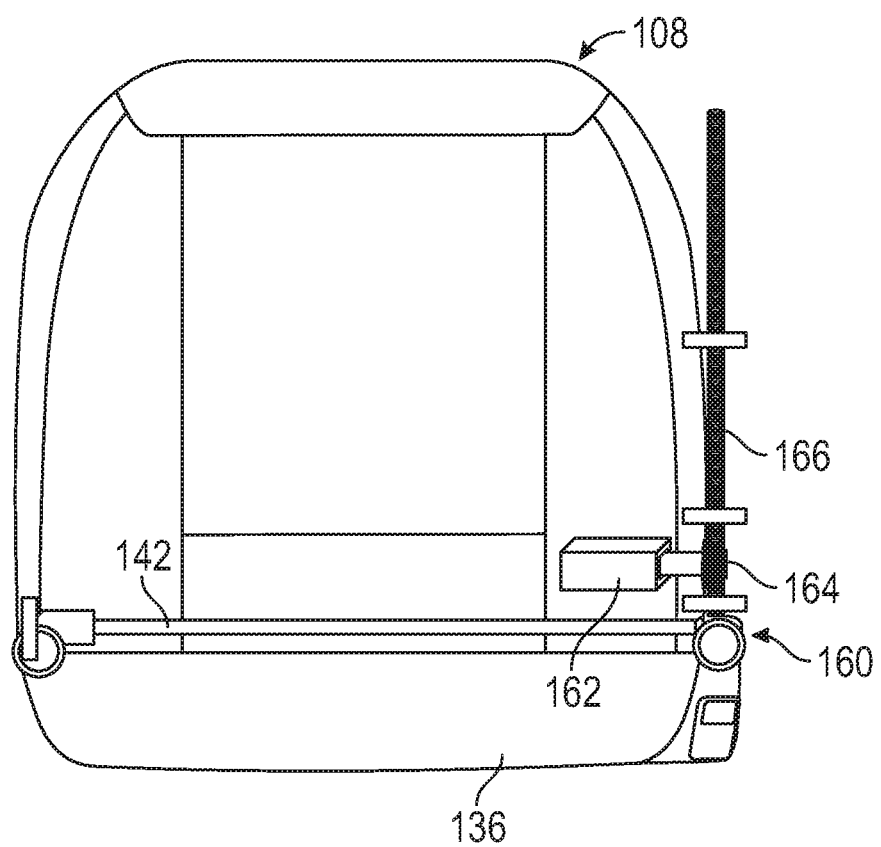
Figure 24:
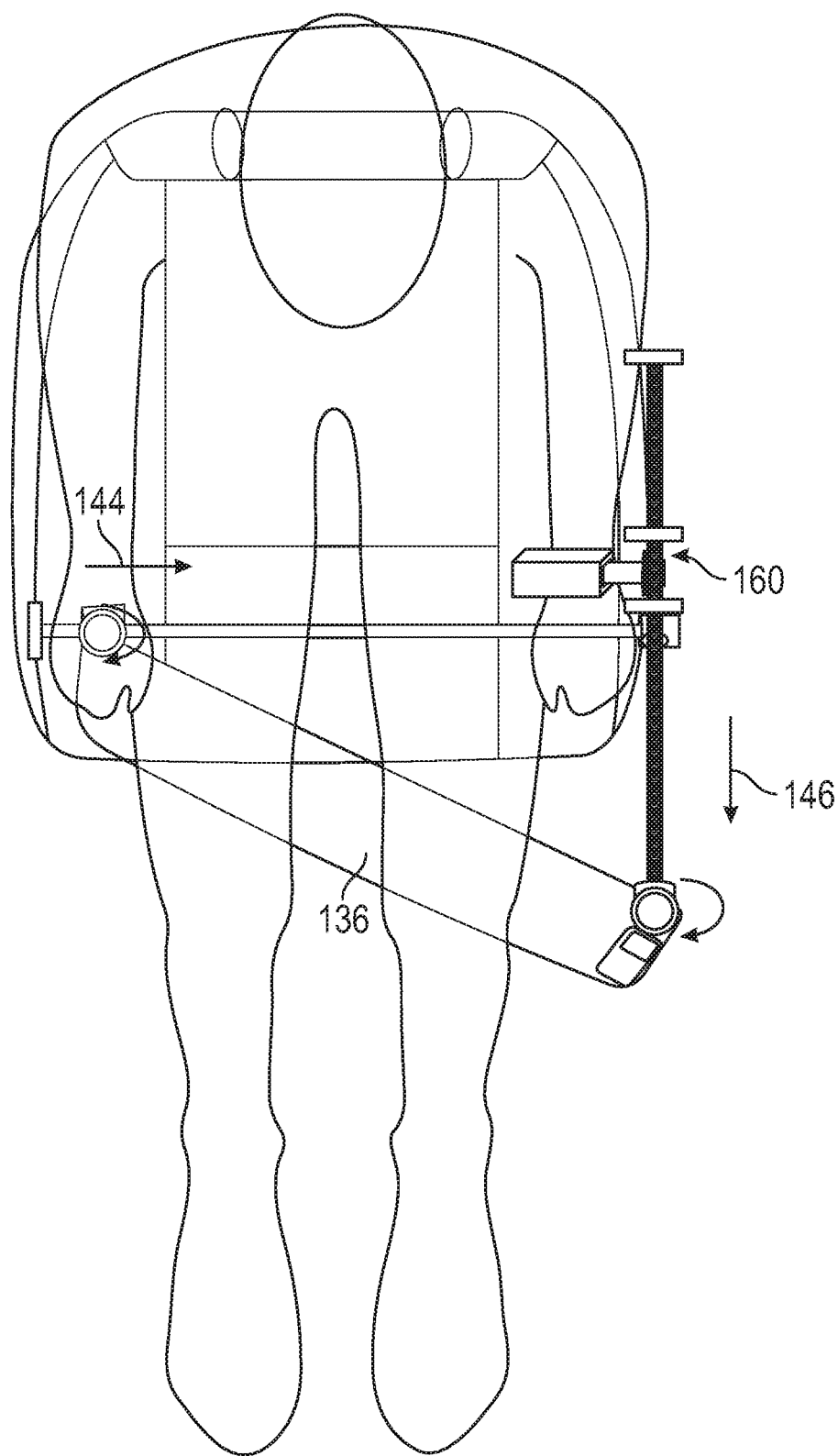
Figure 25:
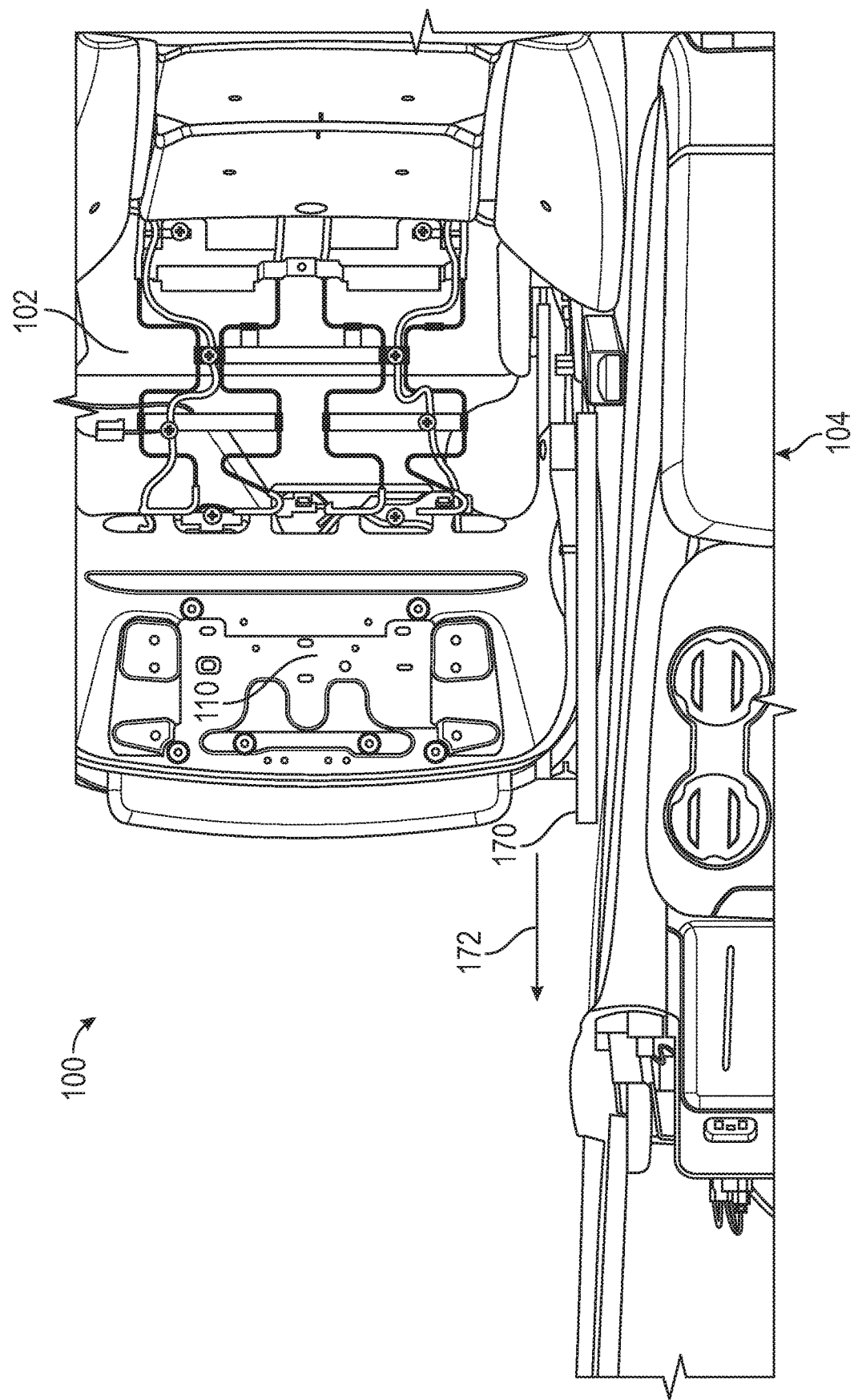
FIGS. 25-30 illustrate an exemplary embodiment of an accessory tray in accordance with the present disclosure.

In FIG. 23, a motor powered open/close mechanism 160 is illustrated as including a stepper motor 162 driving a pinion gear 164 engaged to a worm gear 166 as is known in the art. By operating the stepper motor 162 in one direction, the accessory tray 136 moves from the closed position to the open position. By reversing the stepper motor 162, the accessory tray 136 moves from the open position to the closed position as will be appreciated by those skilled in the art. As noted above, an advantage provided by the various embodiments disclosed in FIGS. 15-24 is that the accessory tray 136 may be opened or closed without interfering with the comfort of a passenger in the passenger seat. As illustrated in FIG. 24, the accessory tray 136 moves below and around the passenger's legs in a manner that is convenient for the passenger.

Figure 26:
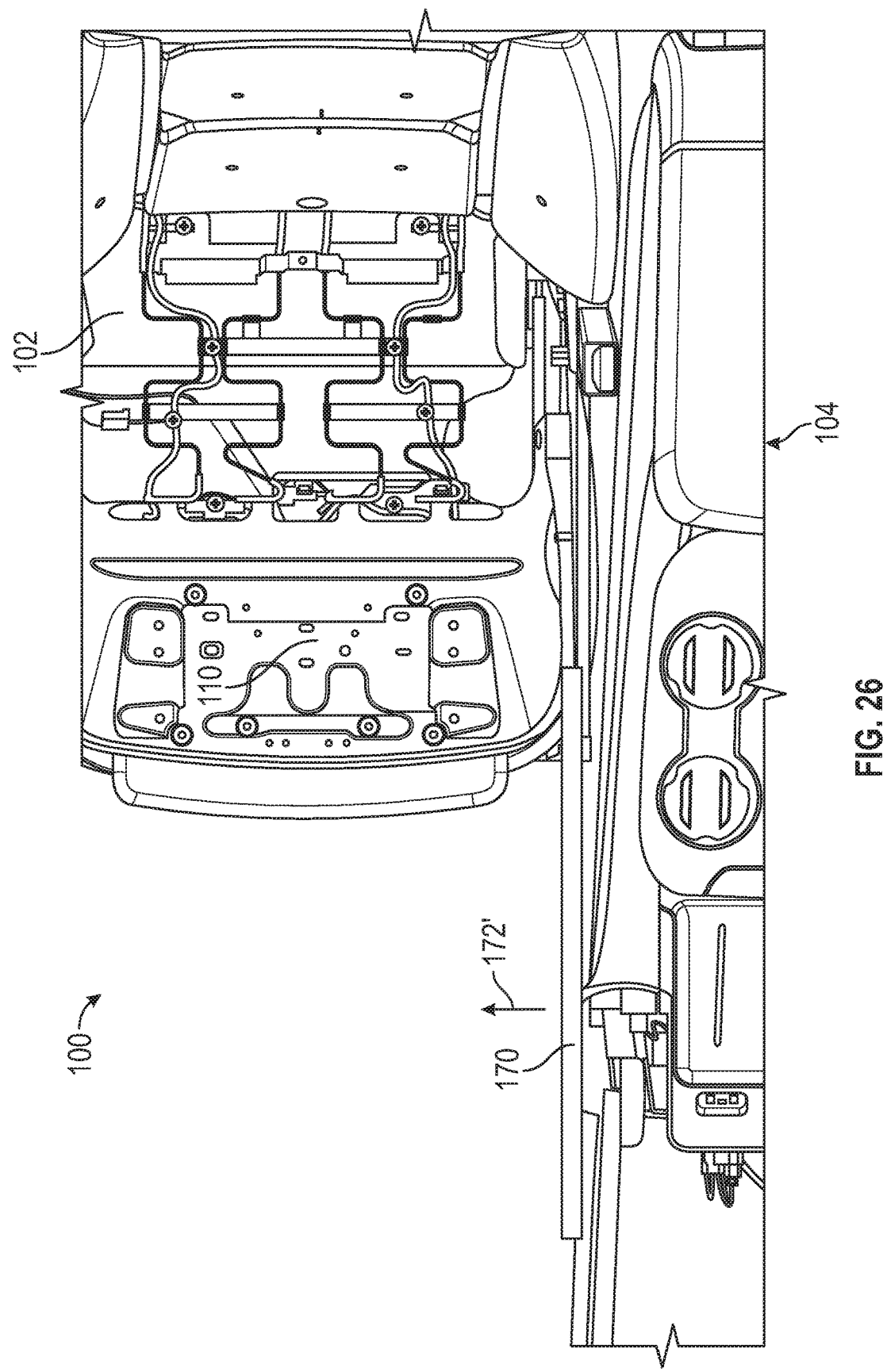
Figure 27:
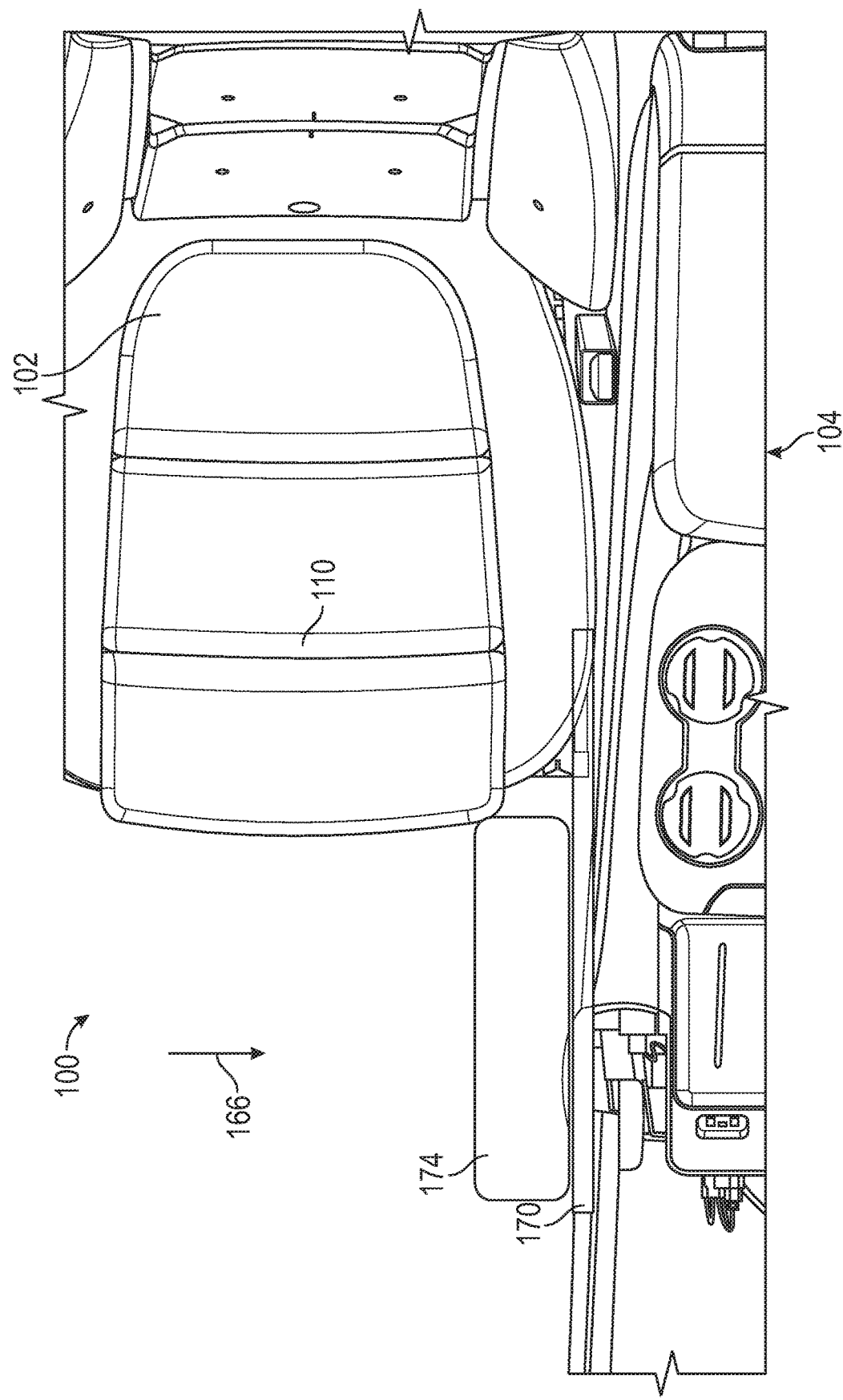
Figure 28:
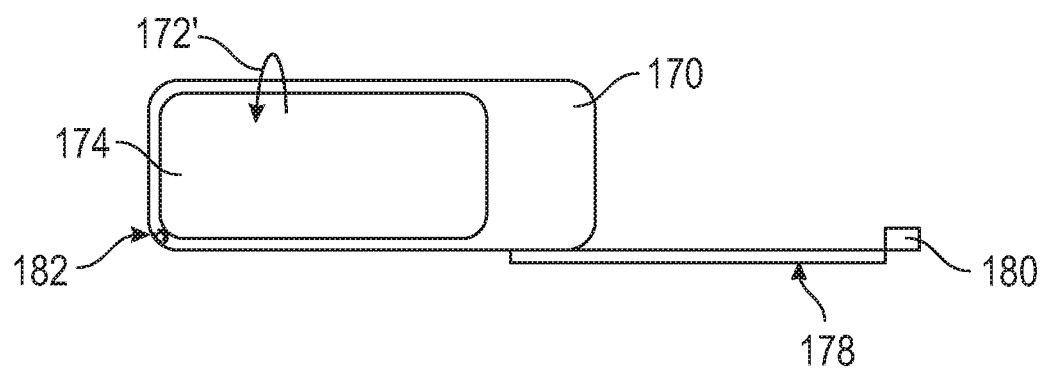
Figure 29:
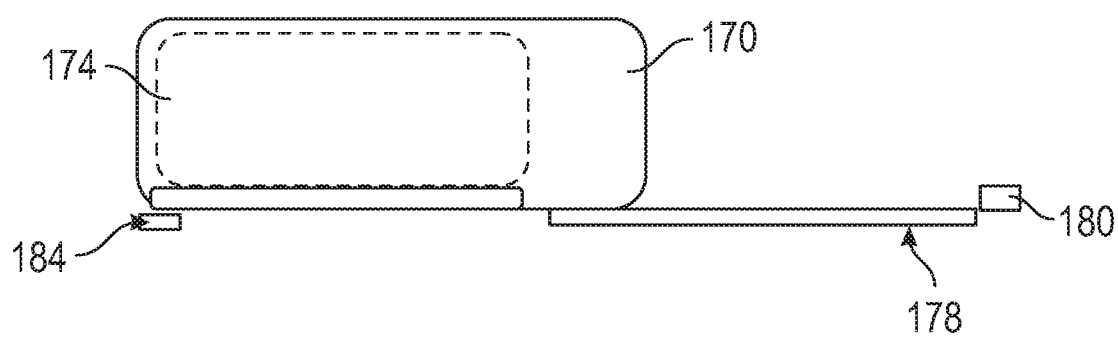
Figure 30:
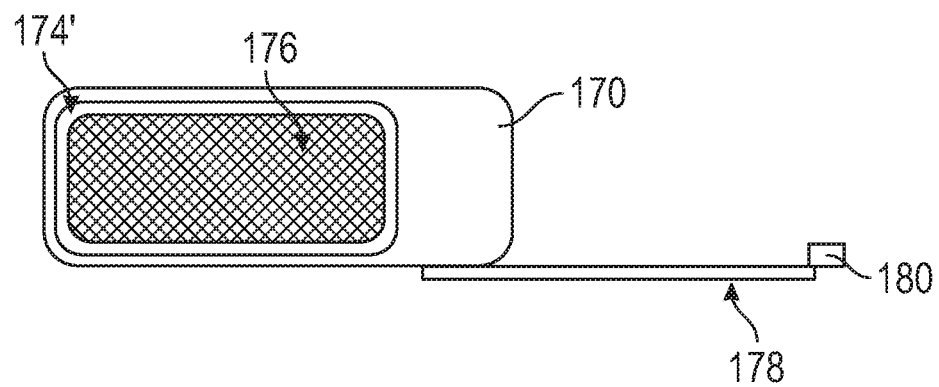

FIGS. 25-30 illustrate another exemplary embodiment of an accessory tray for a vehicle provided by the present disclosure. In this embodiment, the accessory tray 170 is positioned between the seat 102 and the console 104 and a closed position. The accessory tray 170 may be held in the closed position by a latch, such as a push-push latch 180, illustrated in FIGS. 28-30. When released, the accessory tray 170 moves forward as indicated by arrow 172 along a guide 178 to the position illustrated in FIG. 26. Once deployed forward, a portion 174 of the accessory tray 160 drops down as indicated by the arrow 172' to be able to receive an accessory item as illustrated in FIG. 27. Those skilled in the art will further appreciate the operation of the accessory tray 170 with reference to FIGS. 28-30 are illustrated from a perspective indicated by arrow 176.

As illustrated in FIGS. 28-30, the accessory tray 170 may slide forward along guide rail 178 after being released from latch 180. Once deployed from between the seat 102 in the console 104 (as illustrated in FIG. 26) a portion 174 of the accessory tray 170 may drop downward as indicated by the arrow 172' to be able to receive an accessory item as illustrated in FIG. 29. As noted above, the present disclosure contemplates that a magnet 182 made be deployed on the free end of accessory tray 170 to provide magnetic attraction support with the console. Alternately, a support shelf or ridge 174 may be utilized to support the free end of the accessory tray 170. Also the portion 174' of the accessory tray 170 may include expandable netting 176 to receive the accessory item.

While at least one exemplary aspect has been presented in the foregoing detailed description of the disclosure, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing an exemplary aspect of the disclosure. It being understood that various changes may be made in the function and arrangement of elements described in an exemplary aspect without departing from the scope of the disclosure as set forth in the appended claims.

What is claimed is:

1. A vehicle having an accessory storage tray, comprising:
 a front passenger seat having a seat pan and a seat cushion; and
 an accessory tray positioned under a front portion of the seat cushion when the accessory tray is in a closed position, the accessory tray having a first end coupled to the seat pan adjacent to a console via a pivot mechanism and a second free end held in the closed position by a latch;
 the pivot mechanism including a spring-loaded release mechanism, that when operated, releases the latch and allows the spring-loaded release mechanism to move the accessory tray from the closed position to an open position;
 wherein, as the accessory tray pivots via the pivot mechanism, the second free end of the accessory tray moves toward a front driver seat to the open position where the accessory tray is adjacent to the console to receive an accessory item.

2. The vehicle having an accessory storage tray of claim 1, wherein the accessory tray has a bottom portion comprising expandable netting to support the accessory item.

3. The vehicle having an accessory storage tray of claim 1, further comprising a magnet positioned in the second free end of the accessory tray and the console including a metal plate or magnet at a mating location when the accessory tray is the open position whereby magnetic forces between the magnet and the metal place support the second free end of the accessory tray in the open position.

4. The vehicle having an accessory storage tray of claim 1, further comprising a support surface extending from the console positioned to support the second free end of the accessory tray in the open position.

5. A vehicle having an accessory storage tray, comprising:
 a console adjacent to a front passenger seat, the front passenger seat having a seat pan and a seat cushion;
 an accessory tray positioned under a front portion of the seat cushion when the accessory tray is in a closed position, the accessory tray having a first end slidably coupled to a guide coupled along the seat pan and a second end adjacent to the console;

wherein, the accessory tray moves to an open position via the first end moving along the guide toward the console, and the second end moving forward along the console to an open position where the accessory tray is adjacent to the console to receive an accessory item.

6. The vehicle having an accessory storage tray of claim 5, wherein the second end of the accessory tray is held in the closed position by a latch.

7. The vehicle having an accessory storage tray of claim 5, wherein the accessory tray has a bottom portion comprising expandable netting to support the accessory item.

8. The vehicle having an accessory storage tray of claim 5, wherein the second end of the accessory tray includes a magnet and the console include a metal plate at a mating location when the accessory tray is the open position whereby magnetic forces between the magnet and the metal place support the free end of the accessory storage tray in the open position.

9. The vehicle having an accessory storage tray of claim 5, wherein the console includes a support surface extending from the console positioned to support the free end of the accessory storage tray in the open position.

10. The vehicle having an accessory storage tray of claim 5, further comprising a spring assist mechanism for moving the accessory storage tray to the open position.

11. The vehicle having an accessory storage tray of claim 5, further comprising a motor open/close mechanism for moving the accessory storage tray between the open position and the closed position.

12. The vehicle having an accessory storage tray of claim 5, wherein the accessory storage tray moves between the open position and the closed position while a passenger is seated in the front passenger seat.

13. A vehicle having an accessory storage tray, comprising:
 a console adjacent to a front passenger seat, the front passenger seat having a seat pan and a seat cushion;
 an accessory tray positioned between the console and the front passenger seat in a closed position and having one end thereof slidably coupled to a guide coupled to the seat pan, the accessory tray sliding forward along the guide toward an open position wherein a portion of the accessory tray pivots away from the console to receive an accessory item.

14. The vehicle having an accessory storage tray of claim 13, wherein the accessory tray is held in the closed position by a latch.

15. The vehicle having an accessory storage tray of claim 13, wherein the accessory tray has the portion pivoting away from the console including expandable netting to support the accessory item.

16. The vehicle having an accessory storage tray of claim 13, wherein a free end of the accessory tray includes a magnet and the console include a metal plate at a mating location when the accessory tray is the open position whereby magnetic forces between the magnet and the metal place support the free end of the accessory tray in the open position.

17. The vehicle having an accessory storage tray of claim 13, wherein the console includes a support surface extending from the console positioned to support the free end of the accessory tray in the open position.

* * * * *